(12) United States Patent
Nitta et al.

(10) Patent No.: US 6,224,385 B1
(45) Date of Patent: May 1, 2001

(54) JOB AIDING APPARATUS

(75) Inventors: Masao Nitta; Kou Namiki, both of Saitama-ken; Hiroshi Hamano, Tsurugashima; Tadatoshi Tsuji, Sayama, all of (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/114,936

(22) Filed: Jul. 14, 1998

(30) Foreign Application Priority Data

Jul. 15, 1997 (JP) .................................................... 9-189637
Jul. 15, 1997 (JP) .................................................... 9-189649
Jul. 15, 1997 (JP) .................................................... 9-189650

(51) Int. Cl.⁷ .............................. G09B 19/00; G09B 5/00; G09B 7/00

(52) U.S. Cl. ....................... 434/219; 434/118; 434/307 R; 434/323; 434/335; 434/362

(58) Field of Search ............................... 434/72, 118, 219, 434/224, 234, 322, 323, 327, 335, 346, 362, 307 R (56) References Cited

U.S. PATENT DOCUMENTS

| 3,490,160 | * | 1/1970 | Friedhoff et al. ...................... 40/466 |
| 4,812,125 | * | 3/1989 | Strashun ................................ 434/224 |
| 4,977,524 | * | 12/1990 | Strege et al. ......................... 700/279 |
| 6,033,226 | * | 3/2000 | Bullen .................................. 434/219 |

FOREIGN PATENT DOCUMENTS

| 1254445 | | 11/1971 | (GB) . |
| 1569065 | | 6/1980 | (GB) . |
| 2059409A | | 7/1980 | (GB) . |
| 2057717A | | 8/1980 | (GB) . |
| 356082141 | * | 7/1981 | (JP) . |

* cited by examiner

Primary Examiner—John Edmund Rovnak
(74) Attorney, Agent, or Firm—Birch, Stewart, Kolasch & Birch, LLP (57) ABSTRACT

A display unit of a job aiding apparatus disposed in each of work stations displays a job aid image for showing a job detail in each of the work stations. The worker in each of the work stations performs the job according to the displayed job detail. The job aiding apparatus decides whether a job result falls within a predetermined range or not, and changes the job aid image to a next job aid image only when the job result falls within the predetermined range. The worker can thus perform the job accurately and efficiently.

12 Claims, 15 Drawing Sheets

JOB AIDING APPARATUS

BACKGROUND OF THE INVENTION

1. Field of the Invention

The present invention relates to a job aiding apparatus for assisting a worker in accurately and efficiently working on a workpiece based on job images displayed on a display unit.

2. Description of the Related Art

Production lines for manufacturing products, such as automobiles, made of a large number of parts have a plurality of work stations each provided with an assembly manual which describes a work procedure and the numbers of parts assembled in the work station. The worker in each work station assembles desired parts by seeing the assembly manual.

Recent years have seen trends for the manufacture of many types of products in small quantities to meet various needs of users. To minimize investments in production facilities, one production line is supplied with mixed parts for a plurality of products of different kinds. The worker in each work station of such a production line assembles parts according to different assembly manuals for the respective types of products.

However, such a production process is disadvantageous in that the workers cannot fully avoid errors in their job no matter how skilled they may be. For example, the worker in each work station may assemble parts in a wrong sequence or may put together parts of different products. Furthermore, in order to inspect a fastened bolt to see if the torque with which the bolt has been tightened is in a predetermined torque range, the worker reads the torque value from a torque meter and decides whether the torque value falls within the predetermined torque range that is given in the assembly manual. At this time, the worker may make an error in making such a decision.

There have heretofore been available an apparatus for displaying the video of a work procedure for the worker to avoid errors in the work procedure, an apparatus for displaying inspection data on a display unit for the worker to easily confirm the inspection data, and an apparatus for reading a number inherent in a part from the part for the worker to process the part according to an instruction given on the basis of the read number.

However, even with these apparatus being used, it has been unable to check if jobs have been performed as instructed, and it has been impossible to completely avoid errors made by the worker.

SUMMARY OF THE INVENTION

It is a principal object of the present invention to provide a job aiding apparatus for allowing a worker to perform jobs accurately and efficiently on a workpiece.

Another object of the present invention is to provide a job aiding apparatus which is capable of deciding whether an inherent number of a workpiece or an inherent number of a part assembled on a workpiece is proper or not, and giving a proper job instruction to the worker.

Still another object of the present invention is to provide a job aiding apparatus which can reliably decide whether a supplied workpiece or a part assembled on such a supplied workpiece corresponds to a product on a production line which manufactures a plurality of mixed different types of products, so that the products can be manufactured at an increased production rate.

The above and other objects, features, and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
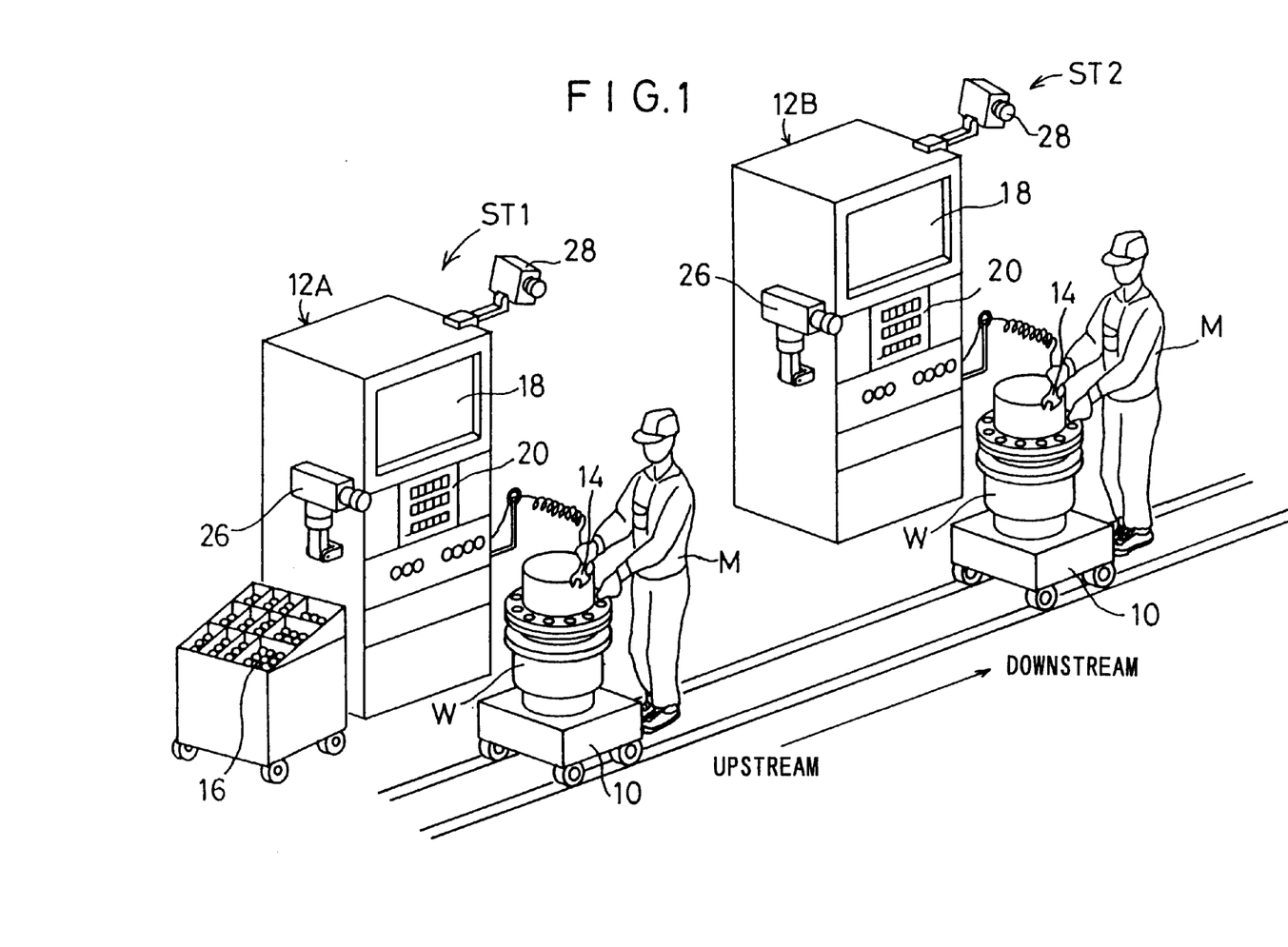
FIG. 1 is a perspective view of a portion of a production line which incorporates job aiding apparatus according to the present invention.

FIG. 1 shows in perspective a portion of a production line which incorporates job aiding apparatus according to the present invention. As shown in FIG. 1, the production line has a first work station ST1 and a second work station ST2 which is positioned downstream of the first work station ST1 with respect to the direction in which workpieces flow along the production line. The first work station ST1 and the second work station ST2 have job aiding apparatus 12A, 12B, respectively. Workpieces W are fed downstream along the production line by respective carriage carts 10. In the first and second work stations ST1, ST2, the workpieces W carried on the respective carriage carts 10 are processed by respective workers M using tools 14, parts 16, etc. as instructed by the job aiding apparatus 12A, 12B, respectively.

Figure 2:
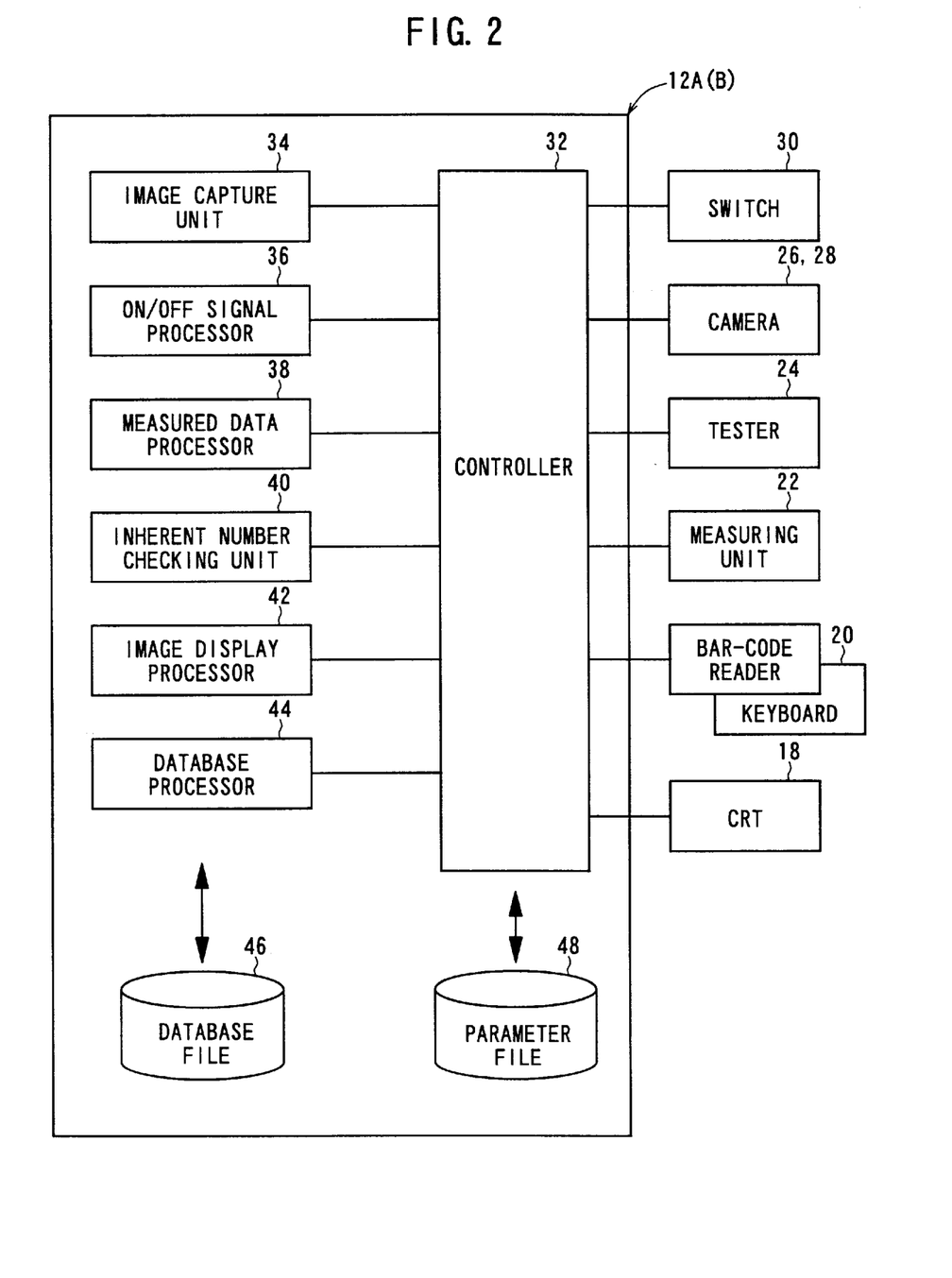
FIG. 2 is a block diagram of the job aiding apparatus shown in FIG. 1.

FIG. 2 shows in block form each of the job aiding apparatus 12A, 12B. As shown in FIG. 2, each of the job aiding apparatus 12A, 12B includes a display unit 18 such as a CRT or the like for displaying job details, job results, etc. with respect to the workpiece W, an input device 20 such as a keyboard, a bar-code reader, etc., a measuring unit 22, a tester 24, video cameras 26, 28 (see also FIG. 1) for recording video images of job states, a switch 30 for manually operating the video camera 26, 28.

Each of the job aiding apparatus 12A, 12B comprises a controller 32 connected to the display unit 18, the input device 20, the measuring unit 22, the tester 24, the video cameras 26, 28, and the switch 30, an image capture unit 34 for capturing images through the video cameras 26, 28, an ON/OFF signal processor 36 for processing ON/OFF signals from the tester 24 which detects whether there is a pressure leakage, etc. or not, a measured data processor 38 for processing measured data produced by the measuring unit 22 associated with the tool 14, which may be a torque wrench or the like, an inherent number checking unit 40 for checking inherent numbers of the workpieces W or the parts 16 which have been entered by the input device 20, an image display processor 42 for displaying images on the display unit 18, and a database processor 44.

Each of inherent numbers is expressed in a format "AA BBBBB ccc-dddd" where "AA BBBBB" indicates a product number and "ccc-dddd" indicates an inherent number of a workpiece W or a part 16. Specifically, if a product to be manufactured is a motor vehicle, then "AA" indicates the type of the motor vehicle, "BBBBB" indicates the type of an engine or the like mounted on the motor vehicle, "ccc" indicates a version number of a workpiece W or a part 16 of the engine, and "dddd" indicates an inherent serial number of the workpiece W or the part 16.

To the database processor 44, there is connected a database file 46 which stores a database of decision data for making decisions about measured data, a database of inherent number data for checking inherent numbers of workpieces W and parts 16, and a database of image data to be displayed on the display unit 18. A parameter file 48 which stores parameters including addresses required for performing various processes.

Figure 3:
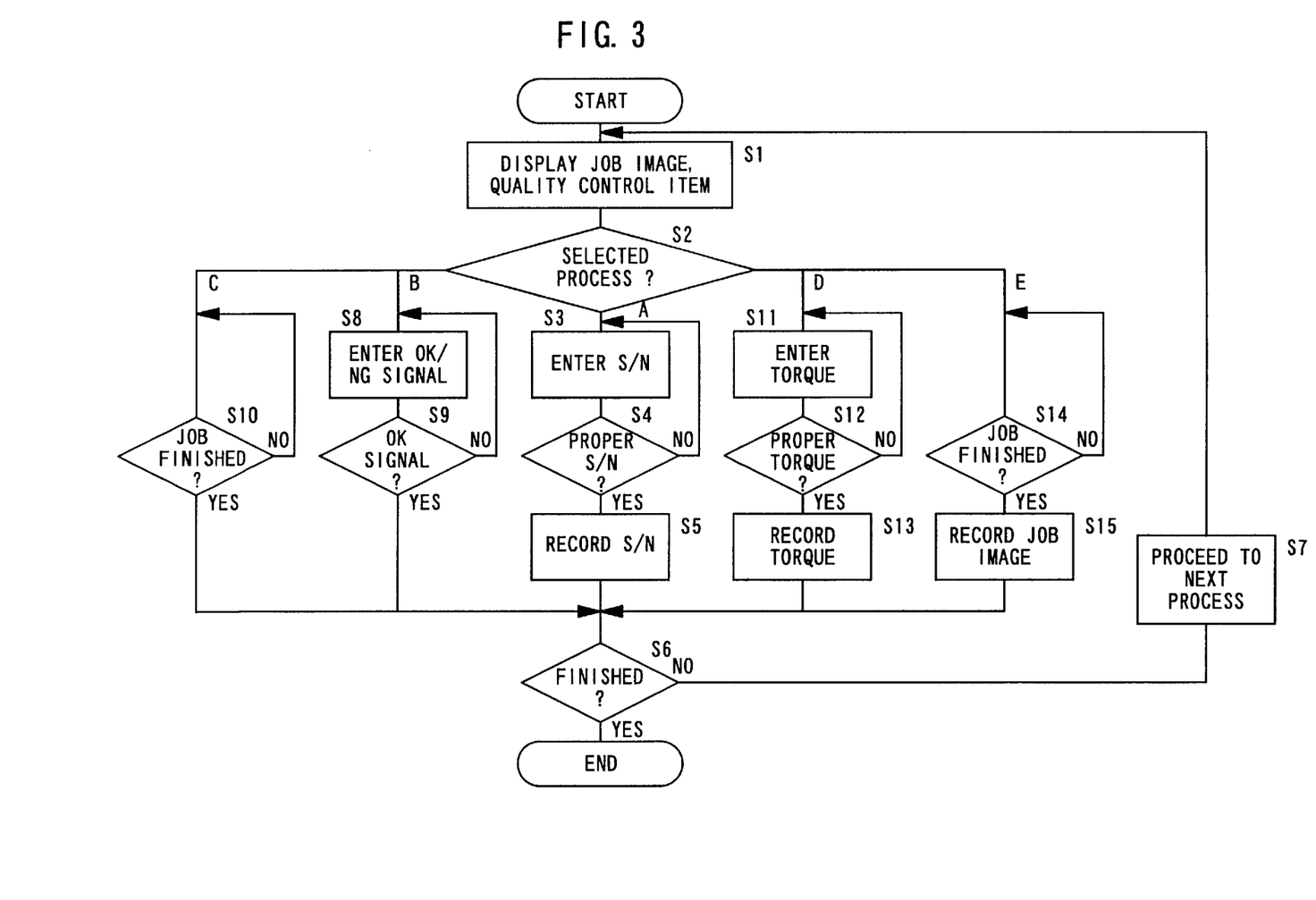
FIG. 3 is a flowchart of an operation sequence of the job aiding apparatus shown in FIG. 1.

A work procedure to be carried out by a worker M using the job aiding apparatus 12A, 12B will be described below with reference to FIG. 3.

The image display processor 42 displays a job aid image 50 (see FIG. 4) on the display unit 18 according to a work procedure read from the database file 46 by the database processor 44 in step S1.

Figure 4:
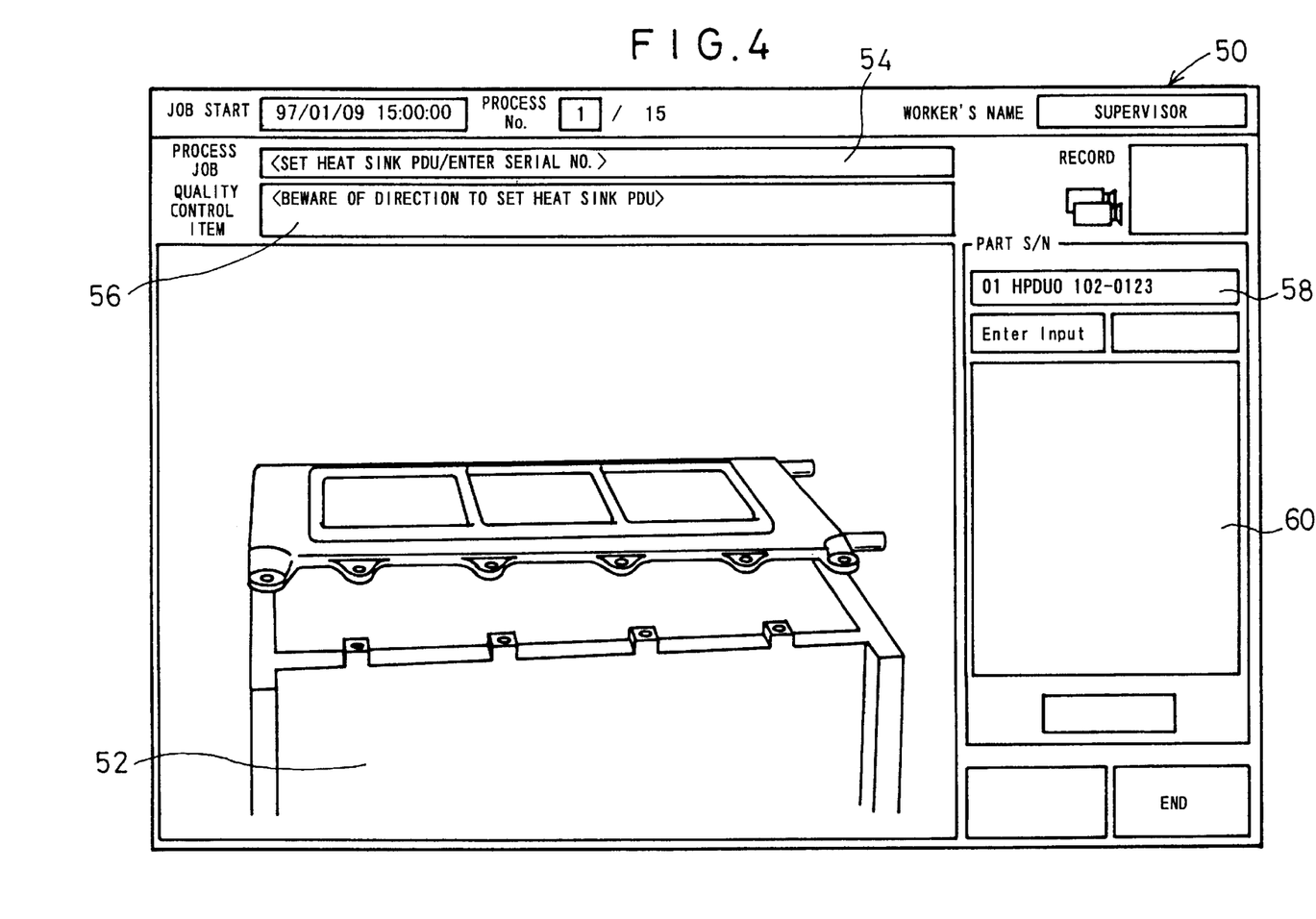
FIGS. 4 through 7 are views showing displayed job aid images for recording an inherent part number.

The job aid image 50 shown in FIG. 4 serves to assist the worker M in recording an inherent number of the workpiece W to be processed. The job aid image 50 includes a job image display area 52 for showing a job to be performed in the first work station ST1 or the second work station ST2, together with an image of the workpiece W, a process work display area 54 for showing a job detail, a quality control item display area 56 for showing a quality control item, a data entry area 58 for entering an inherent number, and a data display area 60 for displaying an entered inherent number.

In step S2, a process A is selected for recording an inherent number.

First, the worker M enters the inherent number, e.g., "01 HPDU0 102-0123", of the workpiece W transferred to the first work station ST1 or the second work station ST2 according to the information displayed in the process work display area 54 and the quality control item display area 56. The worker M may enter the inherent number that has been assigned to the workpiece W, through either the keyboard or the bar-code reader.

The entered inherent number is displayed in the data entry area 58. The inherent number checking unit 40 checks the entered inherent number to see if it is proper or not in step S4. Specifically, the inherent number checking unit 40 decides whether a workpiece W having an inherent number corresponding to a product displayed in the job image display area 52 has been delivered to the first work station ST1 or the second work station ST2 or not by comparing high-order figures of the inherent number, e.g., "01 HPDU0" with inherent number data read from the database file 46.

Figure 5:
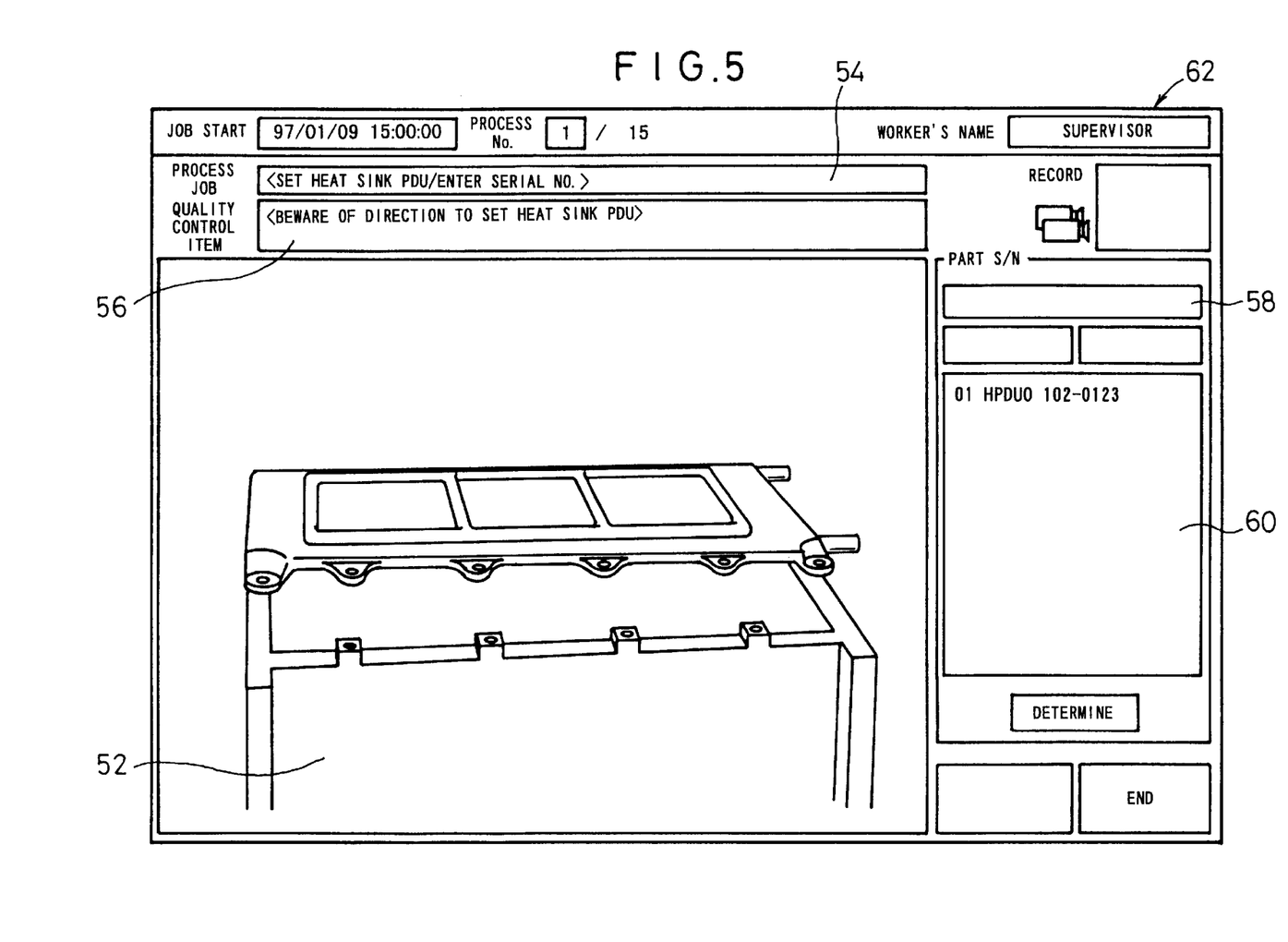

If the entered inherent number is determined as a proper inherent number corresponding to the workpiece W displayed in the job image display area 52, then it becomes possible to point a key "Enter Input". When the worker M points the key "Enter Input", the inherent number is displayed in the data display area 60 in a job aid image 62 shown in FIG. 5, and recorded in the database file 46 by the database processor 44 in step S5. If the entered inherent number does not correspond to the displayed workpiece W, then the key "Enter Input" cannot be pointed, indicating to the worker M that the data has been entered by mistake or the transferred workpiece W is improper.

Figure 6:
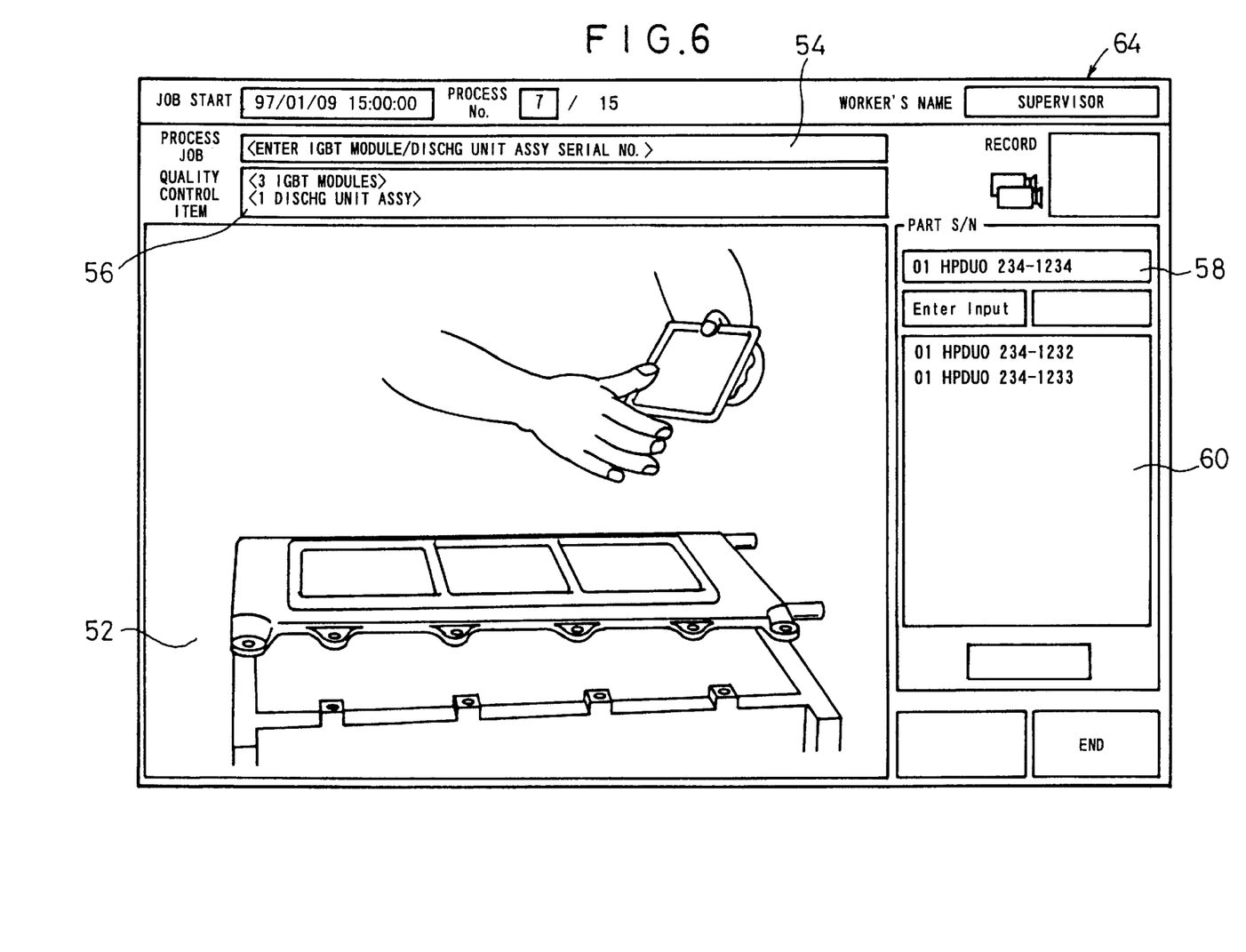

When the proper inherent number is entered, it is decided whether there is a next job in the first work station ST1 or the second work station ST2 or not in step S6. If there is a next job in the first work station ST1 or the second work station ST2, then a process for proceeding to a next job process is carried out in step S7, and then a job aid image 64 shown in FIG. 6 is displayed in step S1. The job aid image 64 serves to prompt the worker M to enter the inherent number of a part 16 to be assembled on the workpiece W shown in FIGS. 4 and 5. Then, the worker M enters the inherent number in the same manner as described above.

Figure 7:
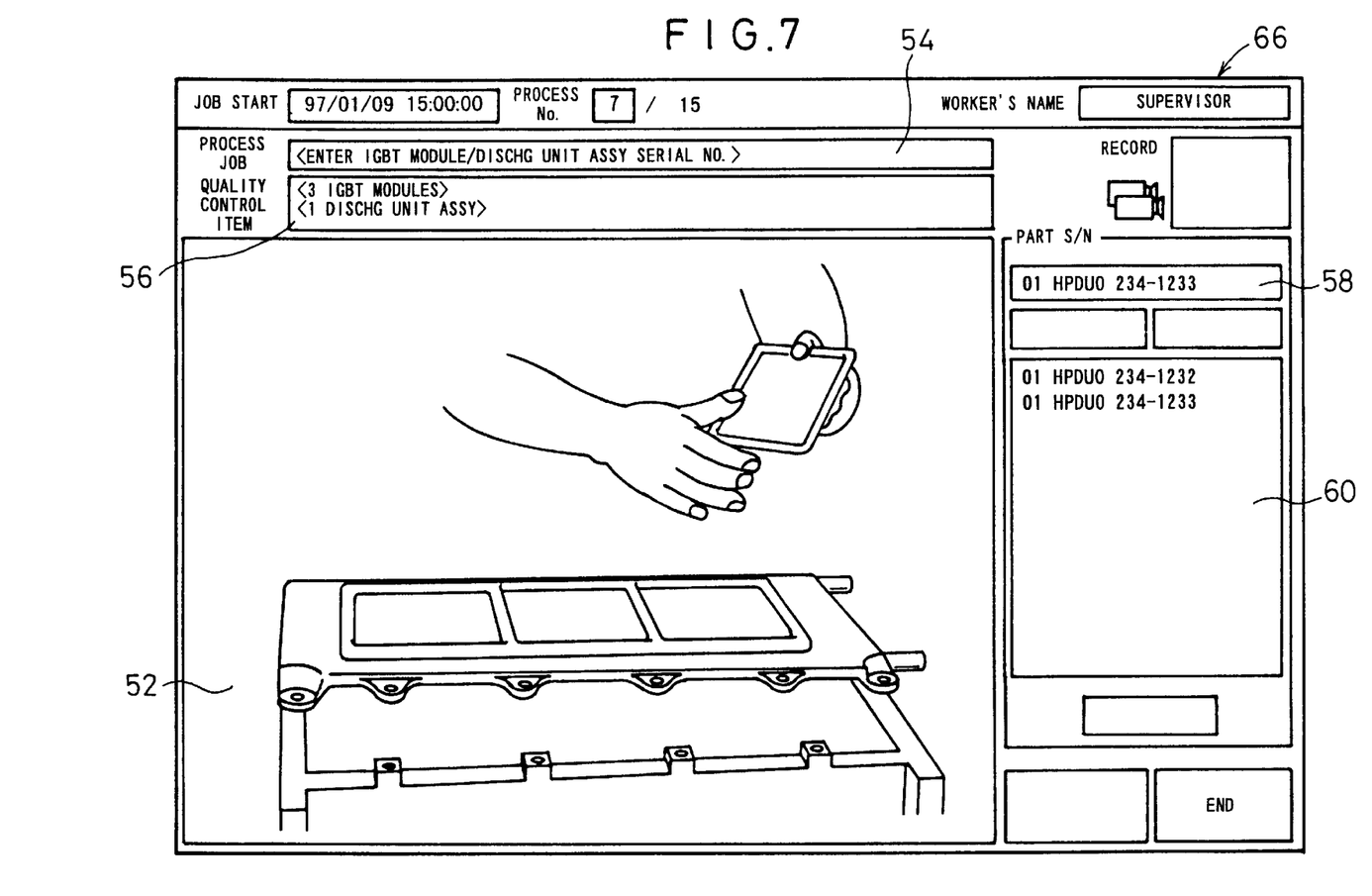

The inherent number entered by the worker M is checked. Specifically, the inherent number checking unit 40 decides whether the workpiece W corresponds to the product by comparing high-order figures of the inherent number, e.g., "01 HPDU0" with inherent number data read from the database file 46. The inherent number checking unit 40 also decides whether low-order figures of the inherent number, e.g., "234-1234", overlap those of an inherent number already entered or not. If the entered inherent number is the same as an inherent number already entered (with figures "234-1233" overlapping) as indicated by a job aid image 66 shown in FIG. 7, then since the key "Enter Input" cannot be pointed, the entered inherent number cannot be recorded. The worker M now recognizes that the inherent number has been entered by mistake or the part 16 assembled on the workpiece W is improper. The worker M reenters a proper inherent number of a proper part in step S4.

As described above, it is checked whether the entered inherent number corresponds to a workpiece W displayed in the job image display area 52 or the entered inherent number is the same as an entered inherent number already entered, so that a wrong process is prevented in advance from occurring.

Figure 8:
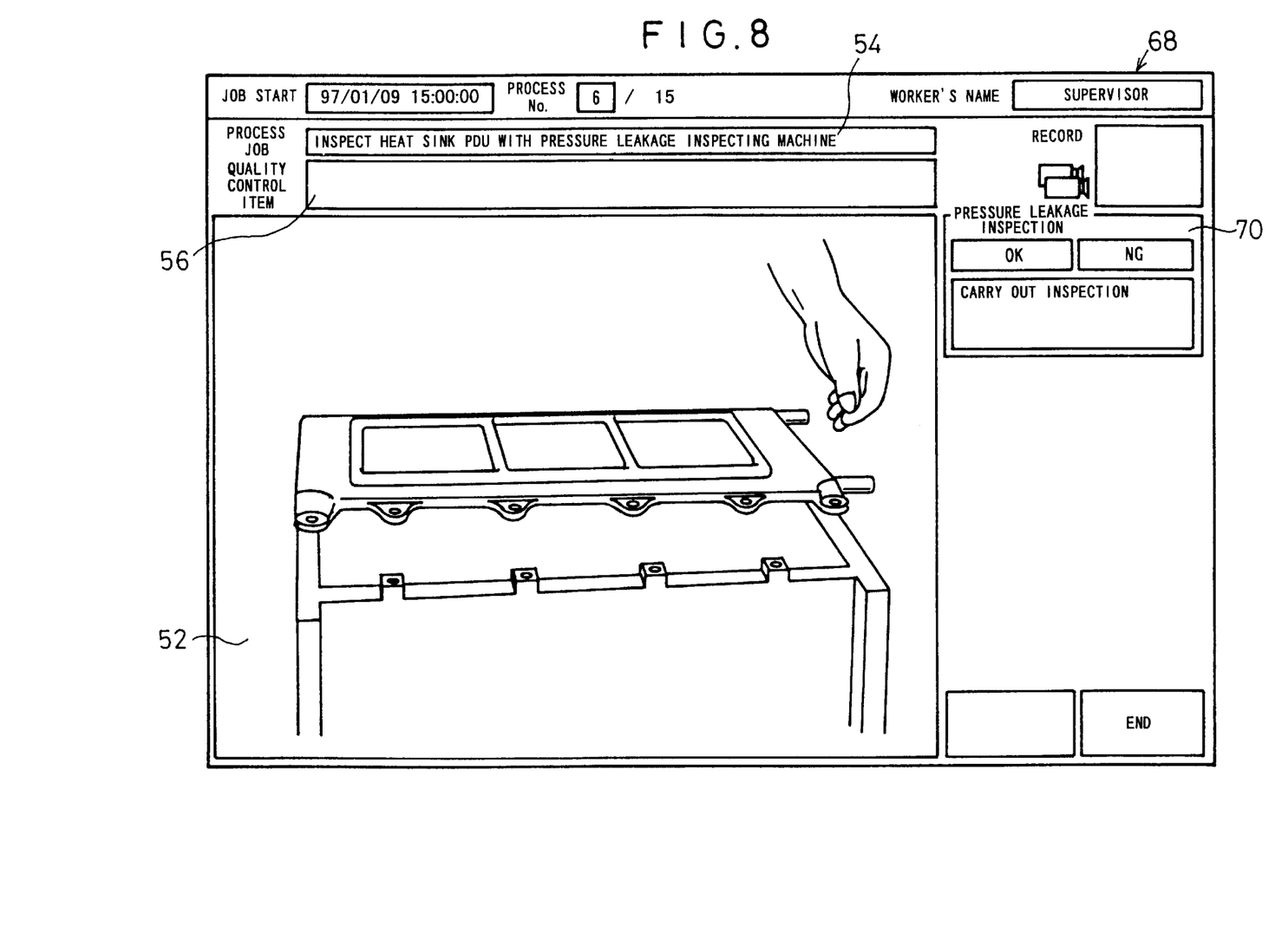
FIGS. 8 through 10 are views showing displayed job aid images for inspecting a workpiece.

After all inherent numbers have been entered, the display unit 18 displays a job aid image 68 relative to a process B which is a next job to be done, in step S1. In step S2, the process B is selected for inspecting the workpiece W.

The worker M inspects the workpiece W with the tester 24, for example, according to details displayed in the process work display area 54, the job image display area 52, and a pressure leakage inspection display area 70 in the job aid image 68. An inspected result produced by the tester 24 is supplied as an OK/NG signal via the controller 32 to the ON/OFF signal processor 36 in step S8.

Figure 9:
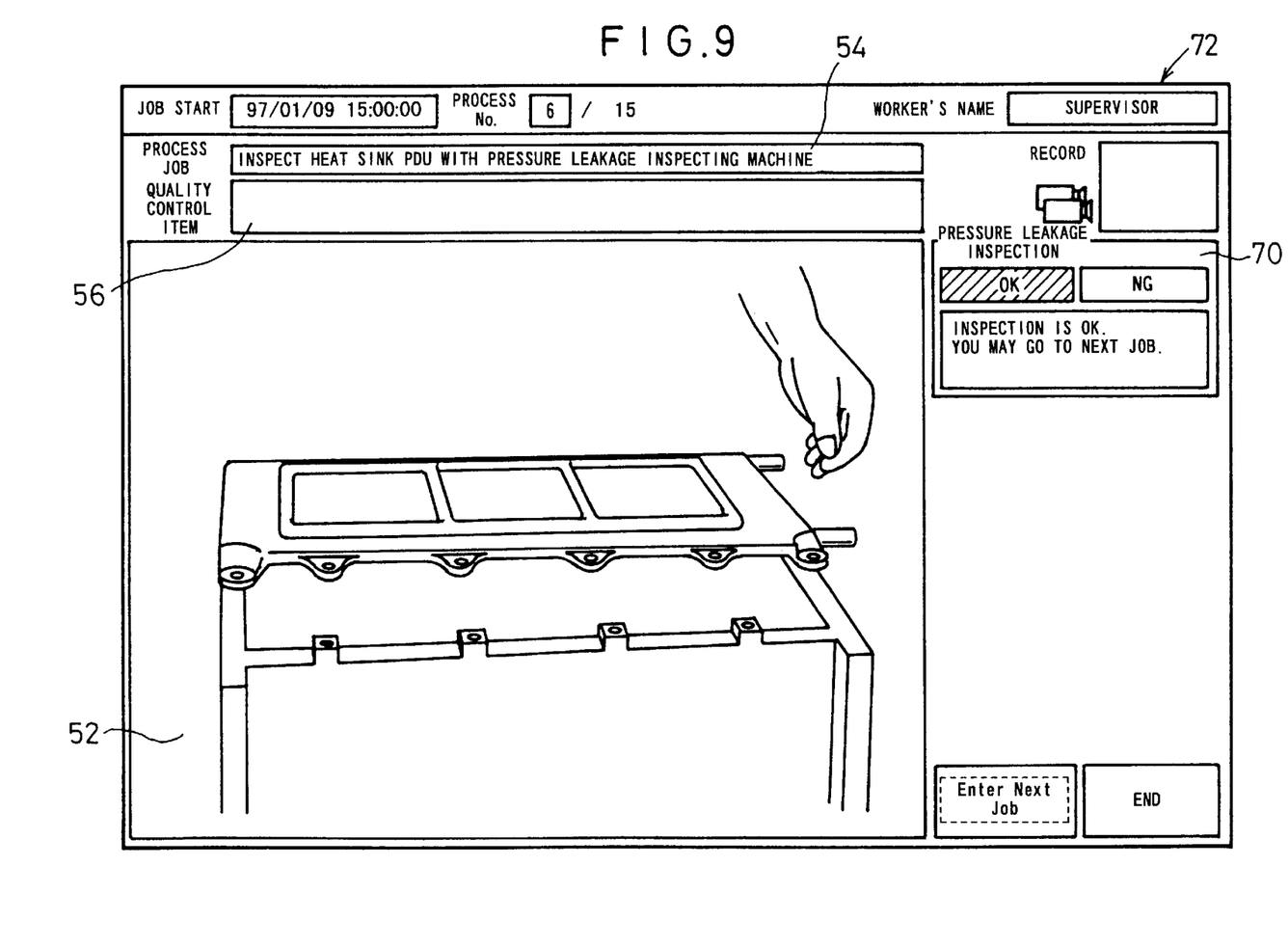

If the inspected result indicates no pressure leakage (OK), then the letters "OK" displayed in the pressure leakage inspection display area 70 are highlighted in a job aid image 72 shown in FIG. 9, indicating to the worker M that workpiece W is free of a pressure leakage and that the worker M may go to a next job in step S9. When the worker M then points a key "Enter Next Job", the job aid image 72 changes to a next job aid image.

Figure 10:
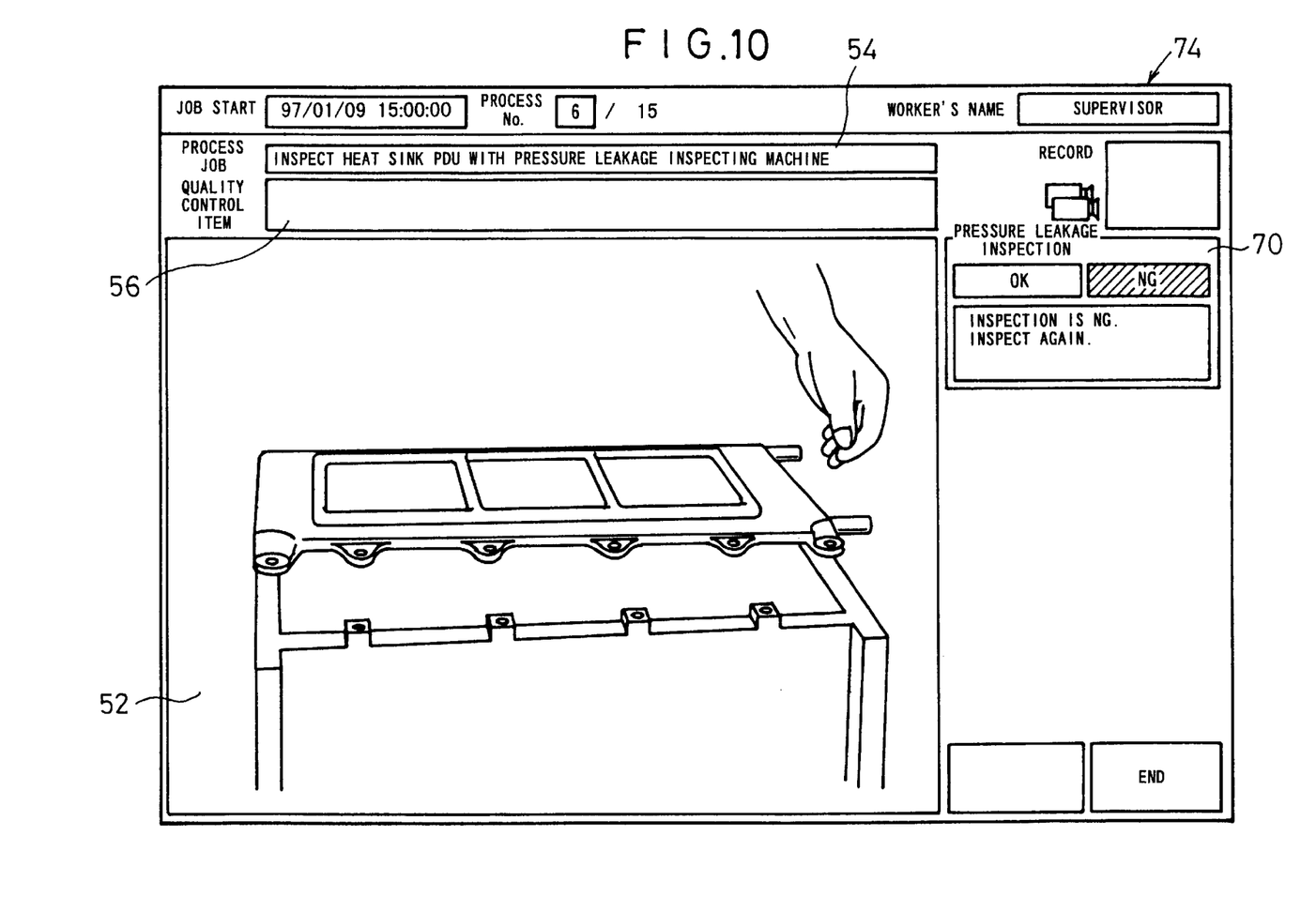

If the inspected result indicates a pressure leakage (NG), then the letters "NG" displayed in the pressure leakage inspection display area 70 are highlighted in a job aid image 74 shown in FIG. 10, indicating to the worker M that workpiece W suffers a pressure leakage and prompting the worker M to inspect the workpiece W again. Since the key "Enter Next Job" (see FIG. 9) cannot be pointed, the worker M cannot proceed to a next process until the inspected result indicates no pressure leakage (OK).

Figure 11:
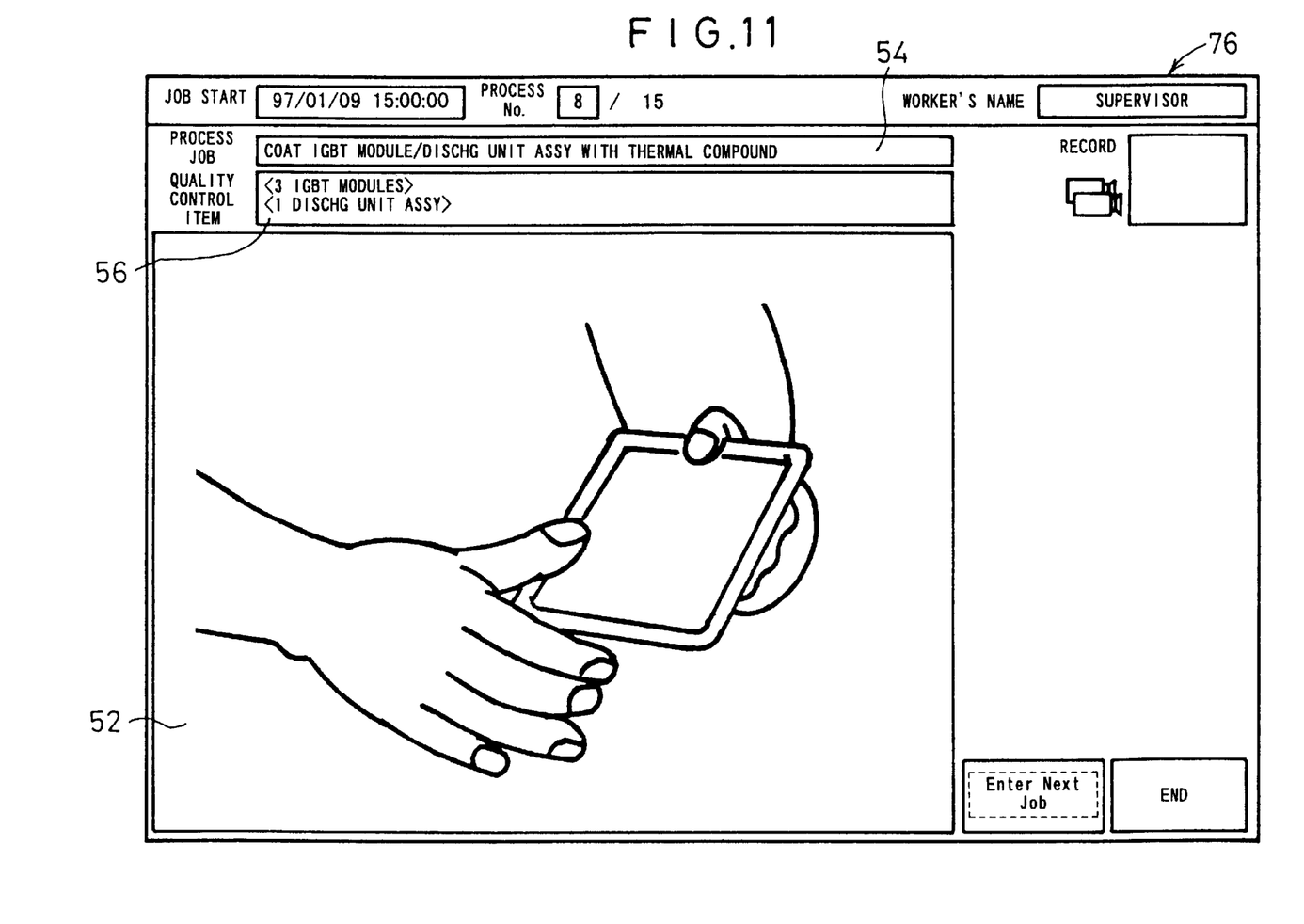
FIG. 11 is a view showing a displayed job aid image of a certain working process at an enlarged scale.

After the workpiece W has been inspected, the display unit 18 displays a job aid image 76 relative to a process C which is a next job to be done, as shown in FIG. 11, in step S1. In step S2, the process C is selected, and then a predetermined job is performed on the workpiece W in step S10.

Figure 12:
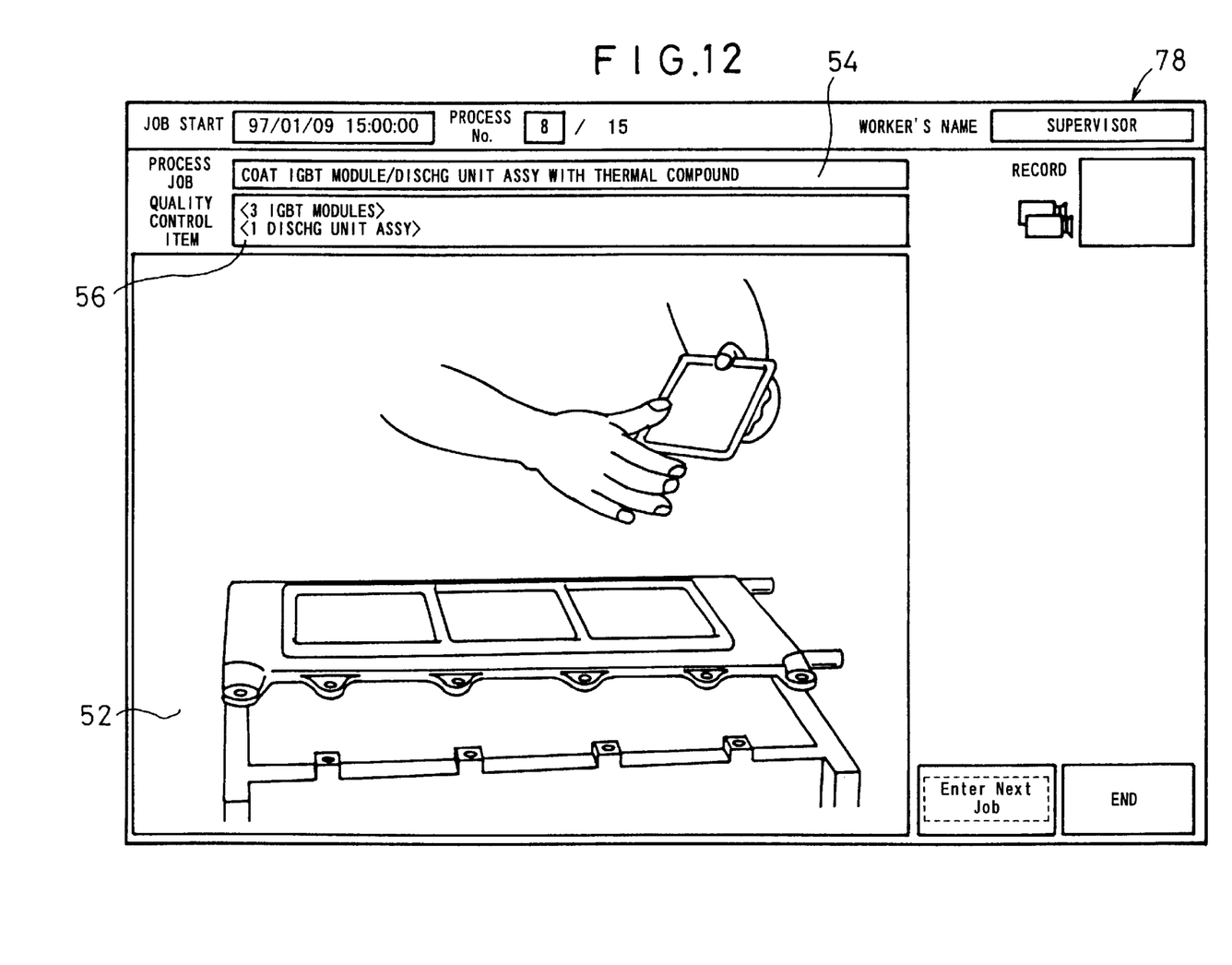
FIG. 12 is a view showing a displayed job aid image of a certain working process at a reduced scale.

In the process C, the worker M coats the workpiece W with a compound, for example, according to a job air image 76 shown in FIG. 11 or a job air image 78 shown in FIG. 12. In the process C, a process such as an inspection process is not carried out. As shown in FIGS. 11 and 12, the job image display area 52 can be enlarged or reduced in size as desired by the worker M for better working efficiency.

Figure 13:
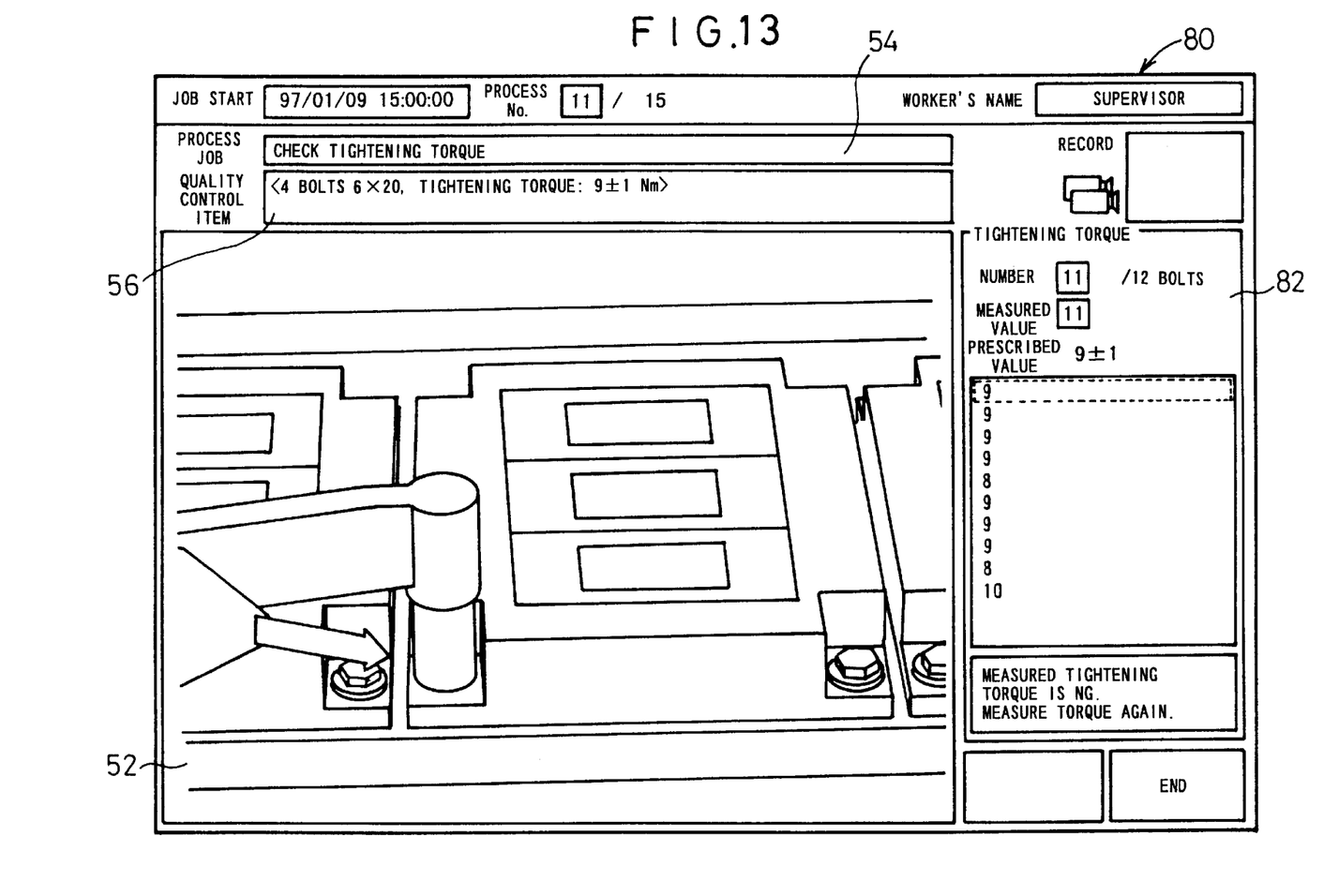
FIGS. 13 and 14 are views showing displayed job aid images for tightening a bolt.

When the worker M points the key "Enter Next Job" after the process C, the display unit 18 displays a job aid image 80 relative to a process D which is a next job to be done, as shown in FIG. 13, in step S1. The job aid image 80 includes a data display area 82 for displaying a measured value, a prescribed value which is an allowable value for the measured value, and data to be recorded. In step S2, the process D is selected for tightening a part 16 on the workpiece W and recording a torque with which the part 16 is tightened.

First, the worker M tightens the part 16, which is a bolt, on the workpiece W at a predetermined position according to an image displayed in the job image display area 52, measures the torque with which the bolt is tightened with the measuring unit 22, and supplies the measured torque through the controller 32 to the measured data processor 38 in step S11.

The data display area 82 displays the measured torque and an allowable range for the measured torque. The measured data processor 38 compares the measured torque with data of the allowable range. If the measured torque does not fall within the allowable range, then the data display area 82 displays information indicating that the measured torque is not a proper torque, prompting the worker M to measure the torque again in step S12. If the measured torque falls within the allowable range, then the data display area 82 displays information indicating that the measured torque is a proper torque, as indicated by a job aid image 84 shown in FIG. 14. The measured torque is recorded in the database file 46 in step S13. Then, a job air image relative to a next job is displayed in step S1. The job image display area 84 can also be enlarged or reduced in size as desired by the worker M for better working efficiency.

Figure 14:
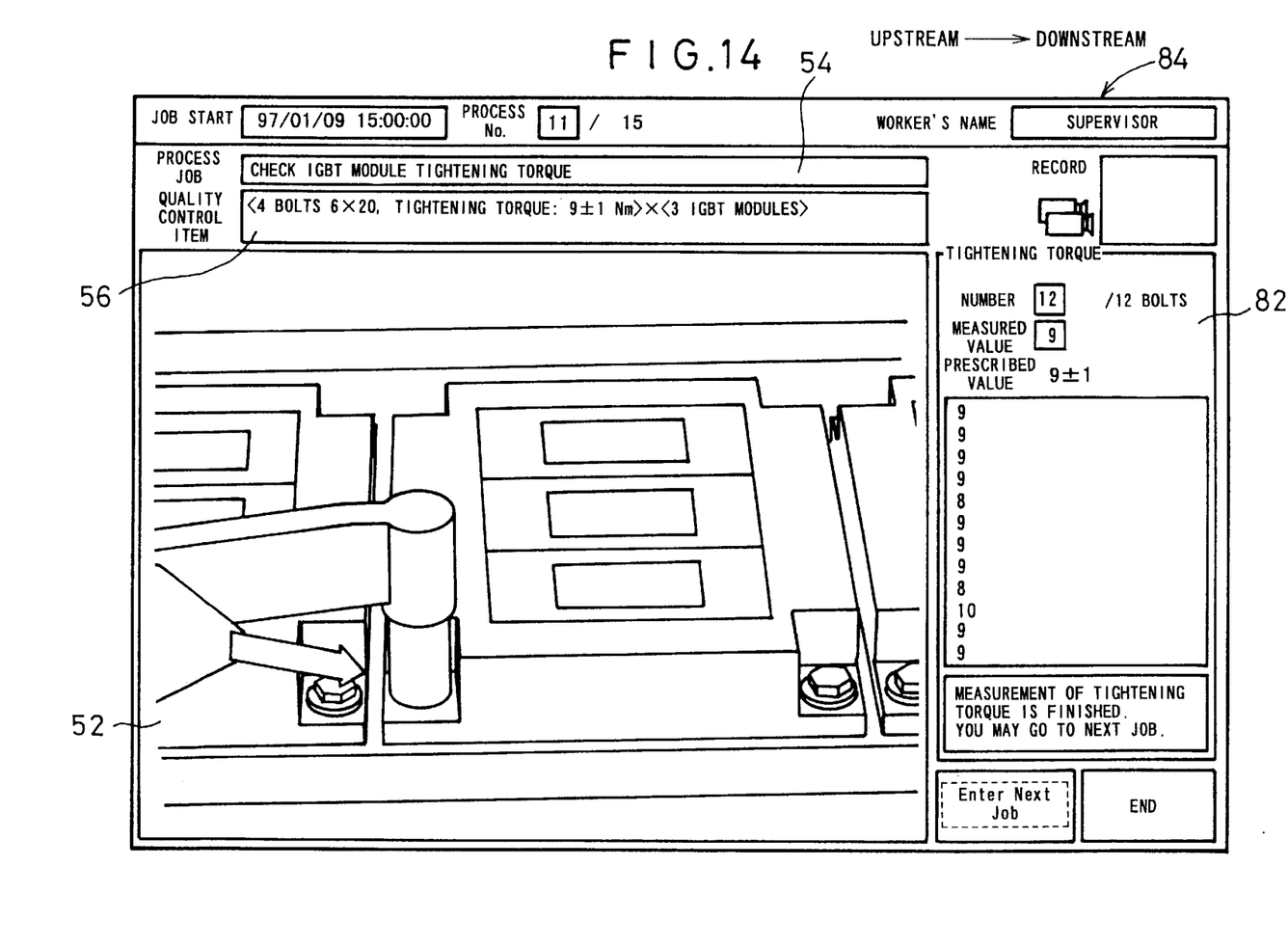

Since the measured torque is automatically checked to see if it falls within the allowable range or not, the worker M is prevented from making decision errors. When the measured torque does not fall within the allowable range, the worker M can determine how far the measured torque is from the allowable range, which may be used as a criteria for measuring the torque again.

Because the job air images 50, 62, 64, 66, 68, 72, 74, 76, 78, 80, 84 include the job image display area 52 and the data display areas 60, 82, 70, which are displayed simultaneously, the worker M can perform jobs and confirm job details and job results while referring to the display unit 81 only. Furthermore, the job image display area 52 displays an image of the workpiece W as viewed from the worker M. Therefore, the worker M is not required to mentally convert a displayed image for grasping working spots as when the image is captured as viewed from the workpiece W so as to include the worker M. Consequently, the worker M can easily and reliably perform jobs to be done.

On the display unit 18, job details are displayed upstream with respect to the direction of the production line, and job results are displayed downstream with respect to the direction of the production line. This display layout allows the worker M to confirm the job details and results from an optimum position with respect to the workpiece W which is moving downstream along the production line. For example, as shown in FIG. 14, the job image display area 52 is displayed upstream with respect to the direction of the production line, and the data display area 82 is displayed downstream with respect to the direction of the production line.

The worker M tightens a bolt as a part 16 on the workpiece W at a predetermined position according to details displayed in the process work display area 54 and the quality control item display area 56 in the job aid image 84, while being assisted by a job detail image displayed in the job image display area 52. The worker M then measures the torque with which the bolt is tightened, and supplies the measured torque through the controller 32 to the measured data processor 38. During this time, the workpiece W is being transferred downstream. Then, the downstream data display area 82 displays the measured torque and its allowable range. The measured data processor 38 compares the measured torque with the allowable range. If the measured torque does not fall within the allowable range, then the measured data processor 38 displays that the measured torque is an improper torque, prompting the worker M to measure the torque again. At this time, the worker M is moving downstream with the workpiece W, and can confirm the job result image displayed in the data display area 82 which is displayed in the downstream region of the display unit 18.

If the job detail image displayed upstream of the job result image is already unnecessary when the job result image is displayed, then only the job result image may be displayed at an enlarged scale on the display unit 18. The worker M can confirm the job result easily based on the enlarged job result image.

Figure 15:
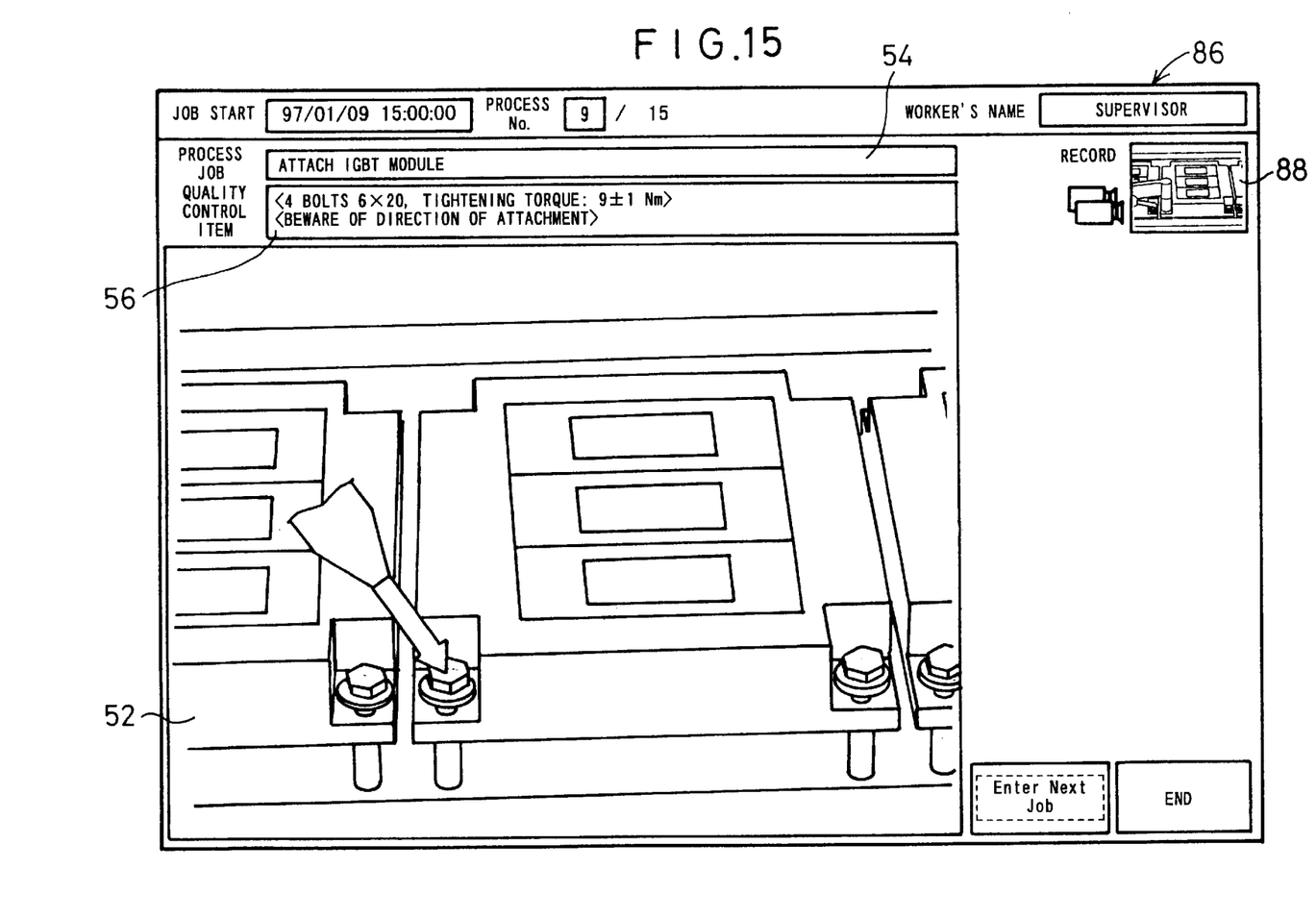
FIG. 15 is a view showing a displayed job aid image for confirming a job state.

In the processes A–D described above, video images of job states may be recorded by the video cameras 26, 28, and may be played back in a playback image display area 88 in a job aid image 86 shown in FIG. 15. The worker M may operate the switch 30 to capture a desired image for confirmation.

In the process D, for example, a number of bolts need to be tightened, and their torques need to be measured. During the process D, the worker M may erroneously measure the torque of one bolt twice. If the worker M erroneously measures the torque of a bolt twice, then a process E is also selected, and the torque measuring process is imaged by the video cameras 26, 28, and recorded by the image capture unit 34 in steps S14, S15. Thereafter, the recorded torque measuring process is displayed in the playback image display area 88 to locate the wrong torque measurement, so that the worker M can take an appropriate corrective action. The video cameras 26, 28 are positioned for taking different images depending on workpiece locations to be processed, and can automatically or manually be switched by the switch 30, depending on the workpiece location where the worker M processes the workpiece W. Since the worker M processes only the erroneous job based on the image that is being played back, the worker M can perform necessary jobs highly efficiently.

Although a certain preferred embodiment of the present invention has been shown and described in detail, it should be understood that various changes and modifications may be made therein without departing from the scope of the appended claims.

What is claimed is:

1. A job aiding apparatus comprising:
   display means for displaying a job detail display image for showing a job detail to be performed on a workpiece;
   job result input means for entering a job result of the job detail based on said job detail display image;
   decision means for deciding whether said job result falls within a predetermined range; and
   switching means including an input key for changing the job detail display image displayed on said display means to a next job detail display image when said job result is determined as falling within said predetermined range by said decision means, said switching means further comprising means for deactivating said input key to prevent the display of said next job detail display image if said job result is determined to be outside of said predetermined range.

2. A job aiding apparatus according to claim 1, wherein said job result input means comprises a measuring unit for measuring said job result, said decision means comprising means for changing the job detail display image displayed on said display means to the next job detail display image when measured data produced by said measuring unit is determined as falling within said predetermined range by said decision means.

3. A job aiding apparatus according to claim 1, further comprising:
   inherent number input means for entering an inherent number of the workpiece or an inherent number of a part assembled on the workpiece.

4. A job aiding apparatus according to claim 3, further comprising:
   decision data holding means for holding decision data for the inherent number;
   said decision means comprising means for comparing the inherent number entered by said inherent number input means with said decision data thereby to decide whether said job result falls within said predetermined range.

5. A job aiding apparatus according to claim 1, further comprising:
   decision data holding means for holding decision data for the job result;
   said decision means comprising means for comparing the job result entered by said job result input means with said decision data thereby to decide whether said job result falls within said predetermined range.

6. A job aiding apparatus according to claim 1, wherein said display means comprises means for displaying an inherent number of the workpiece or an inherent number of a part assembled on the workpiece, and said job result.

7. A job aiding apparatus comprising:
   display means for displaying a job detail display image for showing a job detail to be performed on a workpiece;
   inherent number input means for entering an inherent number of the workpiece or an inherent number of a part assembled on the workpiece, based on the job detail shown by said job detail display image; and
   decision means for deciding whether said inherent number is proper or not;
   said display means comprising means for displaying a next job detail display image if said inherent number is determined as being proper by said decision means.

8. A job aiding apparatus according to claim 7, wherein said decision means comprises means for deciding whether said inherent number entered by inherent number input means is identical to an inherent number which has already been entered.

9. A job aiding apparatus according to claim 7, wherein said decision means comprises means for deciding whether said inherent number entered by inherent number input means corresponds to the job detail display image displayed on said display means.

10. A job aiding apparatus according to claim 7, associated with a production line for manufacturing a plurality of mixed different types of products.

11. A job aiding apparatus according to claim 10, wherein said inherent number comprises a number relative to a product and a number inherent in the workpiece, said decision means comprising means for deciding whether said number relative to the product relates to a product displayed in said job detail display image.

12. A job aiding apparatus according to claim 7, further comprising:
   decision data holding means for holding decision data for said inherent number;
   said decision means comprising means for comparing the inherent number entered by said inherent number input means with said decision data thereby to decide whether said inherent number is proper.

* * * * *